United States Patent
Shimizu et al.

(10) Patent No.: US 7,826,468 B2
(45) Date of Patent: Nov. 2, 2010

(54) SYSTEM AND METHOD FOR BYPASSING AN OUTPUT QUEUE STRUCTURE OF A SWITCH

(75) Inventors: Takeshi Shimizu, Sunnyvale, CA (US); Yukihiro Nakagawa, Cupertino, CA (US)

(73) Assignee: Fujitsu Limited, Kawasaki (JP)

( * ) Notice: Subject to any disclaimer, the term of this patent is extended or adjusted under 35 U.S.C. 154(b) by 946 days.

(21) Appl. No.: 11/462,402

(22) Filed: Aug. 4, 2006

(65) Prior Publication Data
US 2008/0031269 A1  Feb. 7, 2008

(51) Int. Cl.
H04L 12/28  (2006.01)

(52) U.S. Cl. ..................... 370/412; 370/428

(58) Field of Classification Search ........... 370/412, 370/413, 414–420, 542, 264, 428, 429; 709/249, 709/250; 398/43, 56, 89, 99
See application file for complete search history.

(56) References Cited

U.S. PATENT DOCUMENTS

| | | | |
|---|---|---|---|
| 5,872,783 | A | 2/1999 | Chin |
| 6,327,625 | B1 * | 12/2001 | Wang et al. ............ 709/235 |
| 6,724,779 | B1 | 4/2004 | Alleyne et al. |
| 6,766,389 | B2 | 7/2004 | Hayter et al. |
| 6,912,602 | B2 | 6/2005 | Sano et al. |
| 6,912,637 | B1 | 6/2005 | Herbst |
| 6,922,408 | B2 | 7/2005 | Bloch et al. |
| 6,922,749 | B1 | 7/2005 | Gil et al. |
| 6,934,283 | B1 | 8/2005 | Warner |
| 6,941,407 | B2 | 9/2005 | Shah et al. |
| 7,035,255 | B2 | 4/2006 | Tzeng |
| 7,039,770 | B1 * | 5/2006 | Chen et al. ............ 711/151 |
| 2001/0005369 | A1 | 6/2001 | Kloth |
| 2002/0161923 | A1 | 10/2002 | Foster et al. |
| 2002/0184529 | A1 | 12/2002 | Foster et al. |

(Continued)

FOREIGN PATENT DOCUMENTS

| | | |
|---|---|---|
| EP | 1 130 854 A2 | 9/2001 |
| WO | WO 2004/023732 A1 | 3/2004 |

OTHER PUBLICATIONS

Shimizu et al., "A Single Chip Shared Memory Switch with Twelve 10Gb Ethernet Ports", pp. 1-17, Issued Aug. 19, 2003.

(Continued)

*Primary Examiner*—Chi H Pham
*Assistant Examiner*—Kouroush Mohebbi
(74) *Attorney, Agent, or Firm*—Baker Botts L.L.P.

(57) ABSTRACT

In particular embodiments of the present invention, a method for bypassing an output queue structure of a switch is provided. In a particular embodiment, a method for bypassing an output queue structure of a switch includes receiving a packet at an input port of a switch, storing the packet in a memory of the switch, and generating a forwarding request associated with the stored packet and with a particular output port of the switch, the forwarding request identifying the location in the memory of the stored packet. The method also includes determining whether to cause the forwarding request to bypass an output queue structure associated with the particular output port. The method further includes, using the forwarding request, retrieving from the memory the packet associated with the forwarding request and sending the retrieved packet from the particular output port.

32 Claims, 4 Drawing Sheets

U.S. PATENT DOCUMENTS

| | | | |
|---|---|---|---|
| 2003/0131131 | A1 | 7/2003 | Yamada et al. |
| 2004/0158636 | A1 | 8/2004 | Nakagawa et al. |
| 2004/0213237 | A1 | 10/2004 | Yasue et al. |
| 2005/0053006 | A1 | 3/2005 | Hongal et al. |
| 2005/0058149 | A1* | 3/2005 | Howe .................... 370/428 |
| 2005/0226146 | A1 | 10/2005 | Rider |
| 2006/0227777 | A1 | 10/2006 | Shimizu |
| 2007/0268903 | A1 | 11/2007 | Nakagawa |
| 2007/0268926 | A1 | 11/2007 | Nakagawa et al. |
| 2007/0280104 | A1 | 12/2007 | Miyoshi et al. |
| 2008/0031269 | A1 | 2/2008 | Shimizu et al. |
| 2008/0123525 | A1 | 5/2008 | Miyoshi et al. |

OTHER PUBLICATIONS

Horie et al., "Single-Chip, 10-Gigabit Ethernet Switch LSI", pp. 206-213, Fujitsu Sci. Tech. J., 42.2, Issued Jun. 2006.

Seifer, "The Switch Book," Wiley Computer Publishing, ISBN 0-471-34586-5, pp. 1-698, 2000.

IEEE, "Shared and Independent VLAN Learning", Virtual and Bridged Local Area Networks, IEEE Computer Society, 802.1Q-2005, Annex B, pp. 225-232, IEEE Park Avenue, New York, NY, May 19, 2006.

Minkenberg et al., "A Combined Input and Output Queued Packet-Switched System Based on PRIZMA Switch-on-a-Chip Technology," IEEE Communications Magazine, pp. 70-71, Dec. 2000.

Sterbenz et al., "High-Speed Networking" A Systematic Approach to High-Bandwidth Low-Latency Communication, 5 pages, 2001.

Choudhury et al., "Dynamic Queue Length Thresholds for Shared-Memory Packet Switches", IEEE/ACM Transactions on Networking, vol. 6, No. 2, pp. 130-140, Apr. 1998.

Shreedhar et al., "Efficient Fair Queuing Using Deficit Round Robin," pp. 1-21, Oct. 16, 1995.

Roscoe et al., "Predicate Routing: Enabling Controlled Networking," ACM SIGCOMM Computer Communications Review, XP-001224681, vol. 33, No. 1, pp. 65-70, Jan. 2003.

EPO European Search Report for Application No./Patent No. 06007587.6-2416, Reference No. 114 663 a/Iga, Applicant:Fujitsu Ltd., 4 pages, mailed Aug. 1, 2006.

Nakagawa et al., "System and Method for Allocating Memory Resources in a Switching Environment," U.S. Appl. No. 11/419,703, filed May 22, 2006, 42 pages, 5 pps. drawings, 073338.0350.

Nakagawa, "System and Method for Assigning Packets to Output Queues", U.S. Appl. No. 11/419,713, filed May 22, 2006, 40 pages, 4 pps drawings, 073338.0351.

Miyoshi et al., "System and Method for Filtering Packets in a Switching Environment," U.S. Appl. No. 11/462,513, filed Aug. 4, 2006, 38 pages, 4 pps. drawings, 073338.0353.

Miyoshi et al., "System and Method for Managing Forwarded Database Resources in a Switching Environment", U.S. Appl. No. 11/421,679, filed Jun. 1, 2006, 33 pages, 4 pps. drawings, 073338.0354.

Shimizu et al., "Filtering Frames at an Input Port of a Switch", U.S. Appl. No. 11/278,751, filed Apr. 5, 2006, 24 pages, 3 pps. drawings, 073338.0308.

Nakagawa, "Managing Shared Memory Resources in a High-Speed Switching Environment", U.S. Appl. No. 10/3600,085, filed Feb. 7, 2003, 40 pages, 5 pps. drawings, 073338.0115.

Nakagawa, "Queuing Packets Written to Memory for Switching", U.S. Appl. No. 10/360,079, filed Feb. 7, 2003, 37 pages, 4 pps. drawings, 073338.0119.

European Search Report and Office Action, Application No. 07010676.0-1249, 8 pages, Oct. 7, 2007, Oct. 4, 2007.

IEEE Standards, IEEE Standards for Local and Metropolitan Area Network, 802.1Q, May 7, 2003, 11 pages.

* cited by examiner

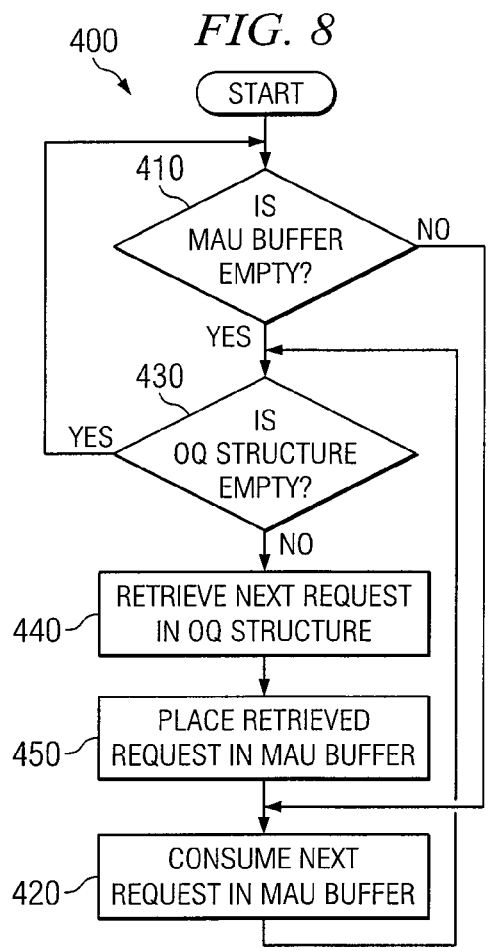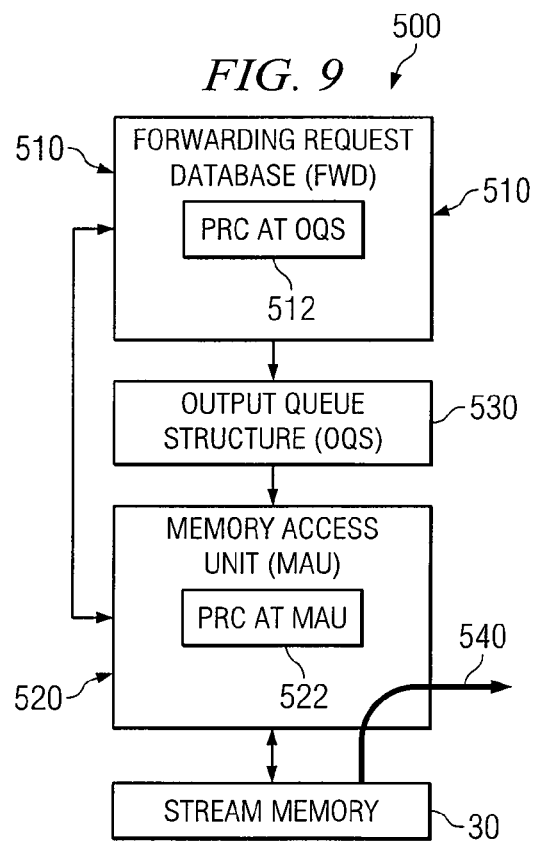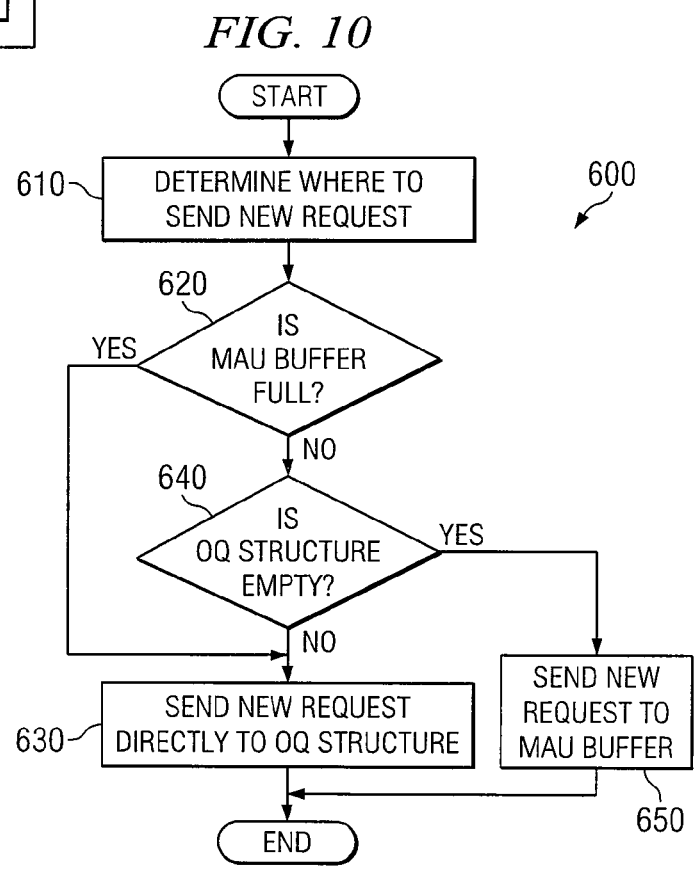

SYSTEM AND METHOD FOR BYPASSING AN OUTPUT QUEUE STRUCTURE OF A SWITCH

TECHNICAL FIELD OF THE INVENTION

This invention relates generally to communication systems and more particularly to a system and method for bypassing an output queue structure of a switch.

BACKGROUND OF THE INVENTION

High-speed serial interconnects have become more common in communications environments, and, as a result, the role that switches play in these environments has become more important. Traditional switches do not provide the scalability and switching speed typically needed to support these interconnects.

SUMMARY OF THE INVENTION

Particular embodiments of the present invention may reduce or eliminate disadvantages and problems traditionally associated with switching packets.

In particular embodiments of the present invention, a method for bypassing an output queue structure of a switch is provided. In a particular embodiment, a method for bypassing an output queue structure of a switch includes receiving a packet at an input port of a switch, storing the packet in a memory of the switch, and generating a forwarding request associated with the stored packet and with a particular output port of the switch, the forwarding request identifying the location in the memory of the stored packet. The method also includes determining whether to cause the forwarding request to bypass an output queue structure associated with the particular output port. The method further includes, using the forwarding request, retrieving from the memory the packet associated with the forwarding request and sending the retrieved packet from the particular output port.

Particular embodiments of the present invention provide one or more advantages. Particular embodiments can enable or disable the bypass of an output queue structure in an output module. Enabling the bypass of the output queue structure may reduce the latency of packets through a switch. When the output queue structure is bypassed, packet transmission requests can be handled directly by a memory access unit without first being queued in the output queue structure, thereby increasing the rate of packet transmission in particular circumstances. Disabling the bypass of the output queue structure may provide strict priority handling of packets. In particular circumstances, strict priority handling from disabling the bypass may be preferable over decreased latency from enabling the bypass. Certain embodiments provide all, some, or none of these technical advantages, and certain embodiments provide one or more other technical advantages readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description, taken in conjunction with the accompanying drawings, in which:

FIG. 8 is a flowchart illustrating an example method for managing the consumption of forwarding requests according to a particular embodiment of the invention;

FIG. 9 is a block diagram illustrating another example output module according to another embodiment of the present invention; and FIG. 10 is a flowchart illustrating another example method for managing the bypass of an output queue structure according to another particular embodiment of the invention.

DESCRIPTION OF EXAMPLE EMBODIMENTS

Figure 1:
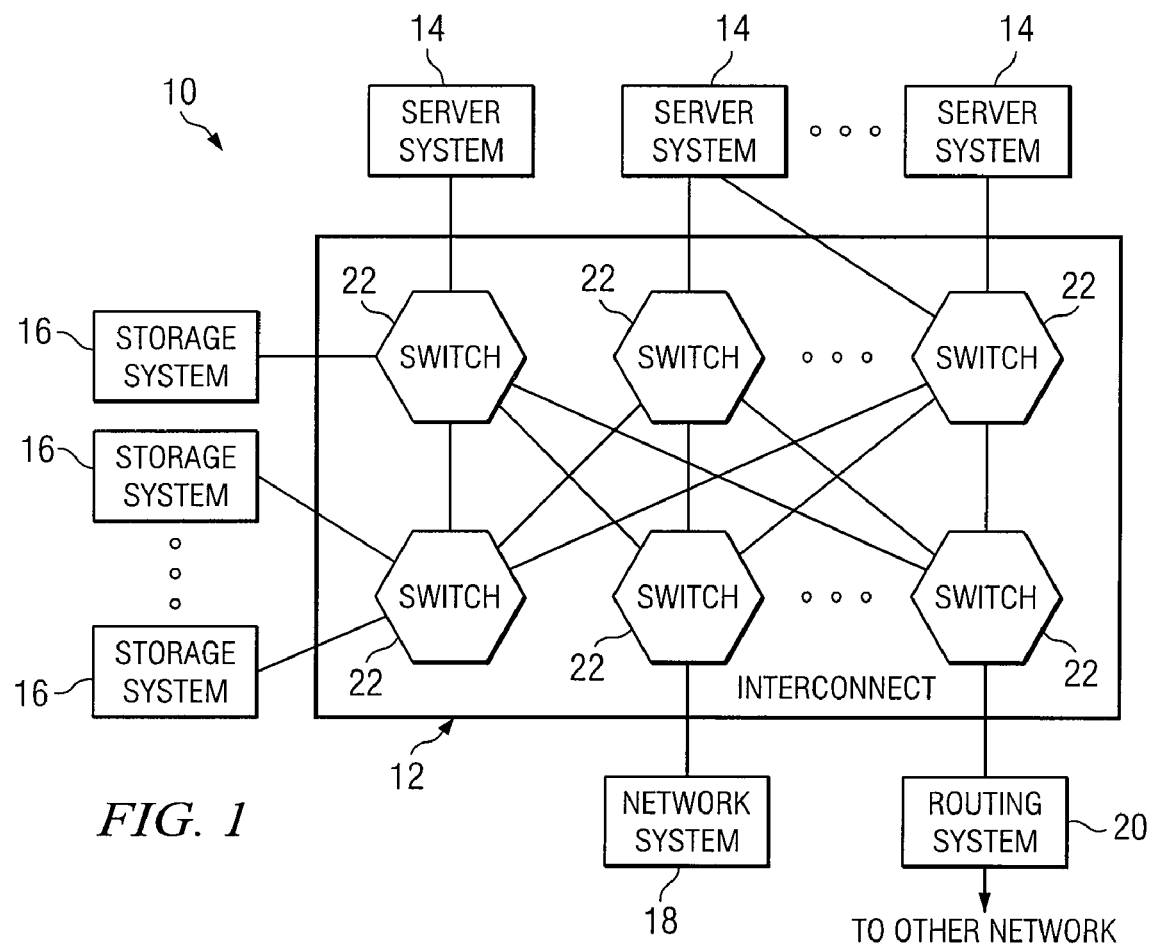
FIG. 1 illustrates an example system area network.

FIG. 1 illustrates an example system area network 10 that includes a serial or other interconnect 12 supporting communication among one or more server systems 14; one or more storage systems 16; one or more network systems 18; and one or more routing systems 20 coupling interconnect 12 to one or more other networks, which include one or more local area networks (LANs), wide area networks (WANs), or other networks. Server systems 14 each include one or more central processing units (CPUs) and one or more memory units. Storage systems 16 each include one or more channel adaptors, one or more disk adaptors, and one or more CPU modules. Interconnect 12 includes one or more switches 22, which, in particular embodiments, include Ethernet switches, as described more fully below. The components of system area network 10 are coupled to each other using one or more links, each of which includes one or more computer buses, local area networks (LANs), metropolitan area networks (MANs), wide area networks (WANs), portions of the Internet, or other wireline, optical, wireless, or other links. Although system area network 10 is described and illustrated as including particular components coupled to each other in a particular configuration, the present invention contemplates any suitable system area network including any suitable components coupled to each other in any suitable configuration.

Figure 2:
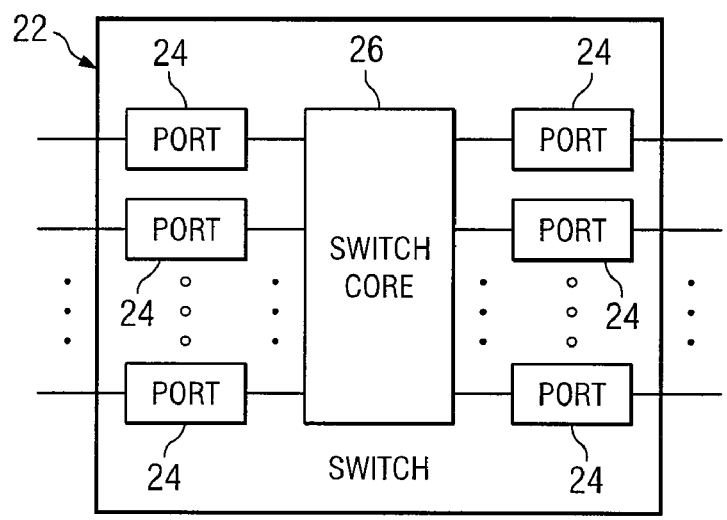
FIG. 2 illustrates an example switch of a system area network.

FIG. 2 illustrates an example switch 22 of system area network 10. Switch 22 includes multiple ports 24 and a switch core 26. Ports 24 are each coupled to switch core 26 and a component of system area network 10 (such as a server system 14, a storage system 16, a network system 18, a routing system 20, or another switch 22). A first port 24 receives a packet from a first component of system area network 10 and communicates the packet to switch core 26 for switching to a second port 24, which communicates the packet to a second component of system area network 10. Reference to a packet can include a packet, datagram, frame, or other unit of data, where appropriate. Switch core 26 receives a packet from a first port 24 and switches the packet to one or more second ports 24, as described more fully below. In particular embodiments, switch 22 includes an Ethernet switch. In particular embodiments, switch 22 can switch packets at or near wire speed.

Figure 3:
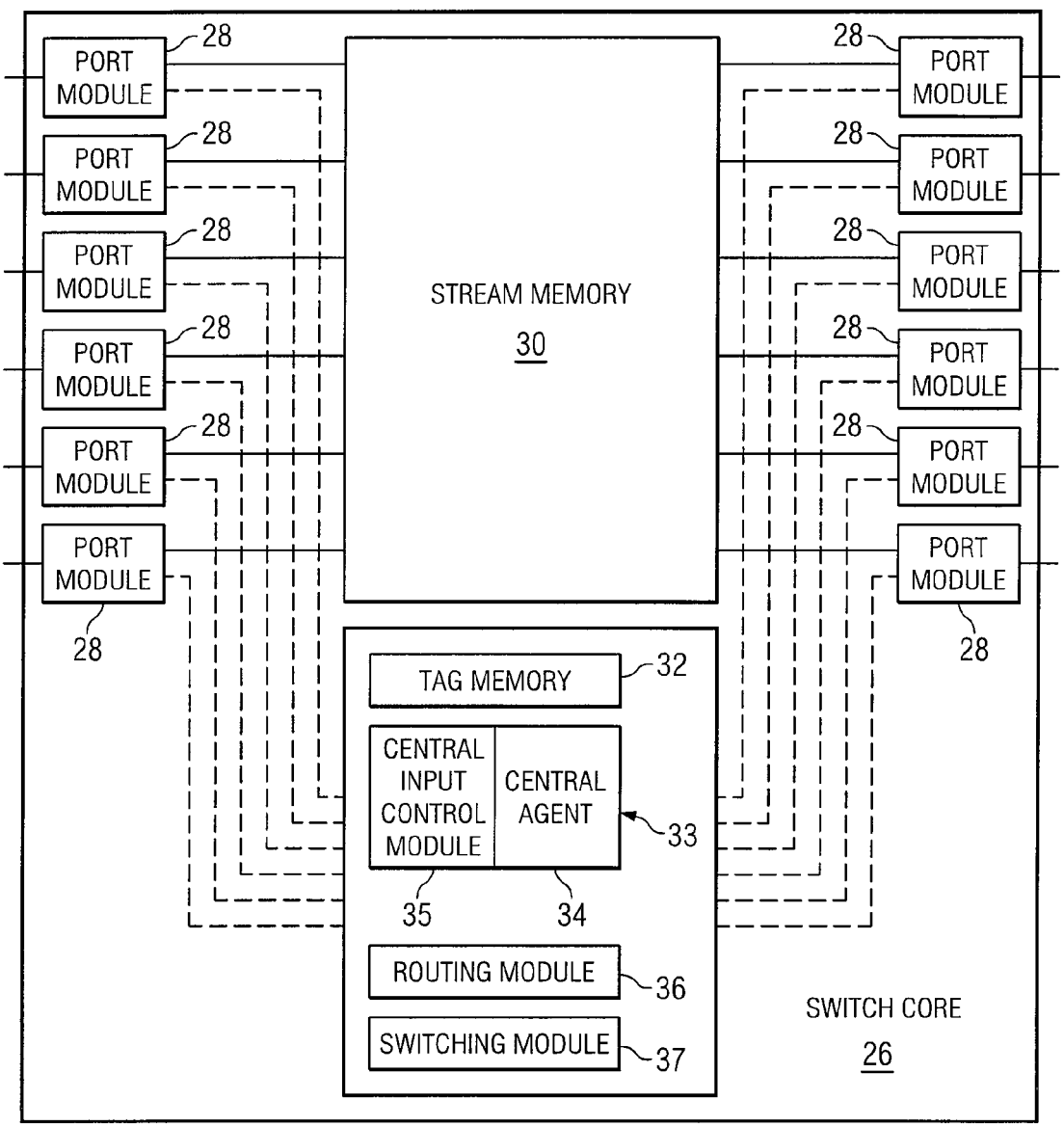
FIG. 3 illustrates an example switch core of a switch.

FIG. 3 illustrates an example switch core 26 of switch 22. Switch core 26 includes port modules 28, stream memory 30, tag memory 32, input control and central agent (ICCA) 33, routing module 36, and switching module 37. The components of switch core 26 are coupled to each other using buses or other links. In particular embodiments, switch core 26 is embodied in a single IC. In a default mode of switch core 26, a packet received by switch core 26 from a first component of system area network 10 can be communicated from switch core 26 to one or more second components of system area network 10 before switch core 26 receives the entire packet. In particular embodiments, cut-through forwarding provides one or more advantages (such as reduced latency, reduced memory requirements, and increased throughput) over store-and-forward techniques. Switch core 26 can be configured for different applications. As an example and not by way of limitation, switch core 26 can be configured for an Ethernet switch 22 (which includes a ten-gigabit Ethernet switch 22 or an Ethernet switch 22 in particular embodiments); an INFINIBAND switch 22; a 3GIO switch 22; a HYPER-TRANSPORT switch 22; a RAPID IO switch 22; a proprietary backplane switch 22 for storage systems 16, network systems 18, or both; or other switch 22. It should be noted that, although switch core 26 includes twelve port modules 28 in the illustrated embodiment, switch core 26 may include any suitable number of port modules 28 (including, i.e., twenty-two).

A port module 28 provides an interface between switch core 26 and a port 24 of switch 22. Port module 28 is communicatively coupled to port 24, stream memory 30, tag memory 32, ICCA 33, routing table 36, and switching module 37. In particular embodiments, port module 28 includes both input logic (which is used for receiving a packet from a component of system area network 10 and writing the packet to stream memory 30) and output logic (which is used for reading a packet from stream memory 30 and communicating the packet to a component of system area network 10). As an alternative, in particular embodiments, port module 28 includes only input logic or only output logic. Reference to a port module 28 can include a port module 28 that includes input logic, output logic, or both, where appropriate. Port module 28 can also include an input buffer for inbound flow control. In an Ethernet switch 22, a pause function can be used for inbound flow control, which can take time to be effective. The input buffer of port module 28 can be used for temporary storage of a packet that is sent before the pause function stops incoming packets. Because the input buffer would be unnecessary if credits are exported for inbound flow control, as would be the case in an INFINIBAND switch 22, the input buffer is optional. In particular embodiments, the link coupling port module 28 to stream memory 30 includes two links: one for write operations (which include operations of switch core 26 in which data is written from a port module 28 to stream memory 30) and one for read operations (which include operations of switch core 26 in which data is read from stream memory 30 to a port module 28). Each of these links can carry thirty-six bits, making the data path between port module 28 and stream memory 30 thirty-six bits wide in both directions.

A packet received by a first port module 28 from a first component of system area network 10 is written to stream memory 30 from first port module 28 and later read from stream memory 30 to one or more second port modules 28 for communication from second port modules 28 to one or more second components of system area network 10. Reference to a packet being received by or communicated from a port module 28 can include the entire packet being received by or communicated from port module 28 or only a portion of the packet being received by or communicated from port module 28, where appropriate. Similarly, reference to a packet being written to or read from stream memory 30 can include the entire packet being written to or read from stream memory 30 or only a portion of the packet being written to or read from stream memory 30, where appropriate. Any port module 28 that includes input logic (an "input port module") can write to stream memory 30, and any port module 28 that includes output logic (an "output port module") can read from stream memory 30. In particular embodiments, a port module 28 may include both input logic and output logic and may thus be both an input port module and an output port module. In particular embodiments, the sharing of stream memory 30 by port modules 28 eliminates head-of-line blocking (thereby increasing the throughput of switch core 26), reduces memory requirements associated with switch core 26, and enables switch core 26 to more efficiently handle changes in load conditions at port modules 28.

Figure 4:
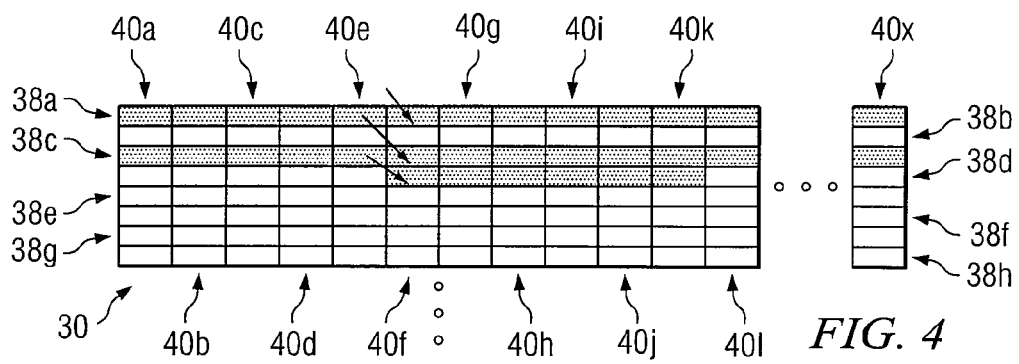
FIG. 4 illustrates an example stream memory of a switch core logically divided into blocks.

Stream memory 30 of switch core 26 is logically divided into blocks 38, which are further divided into words 40, as illustrated in FIG. 4. A row represents a block 38, and the intersection of the row with a column represents a word 40 of block 38. In particular embodiments, stream memory 30 is divided into 4096 blocks 38, each block 38 includes twenty-four words 40, and a word 40 includes seventy-two bits. Although stream memory 30 is described and illustrated as being divided into a particular number of blocks 38 that are divided into a particular number of words 40 including a particular number of bits, the present invention contemplates stream memory 30 being divided into any suitable number of blocks 38 that are divided into any suitable number of words 40 including any suitable number of bits. Packet size can vary from packet to packet. A packet that includes as many bits as or fewer bits than a block 38 can be written to one block 38, and a packet that includes more bits than a block 38 can be written to more than one block 38, which need not be contiguous with each other.

When writing to or reading from a block 38, a port module 28 can start at any word 40 of block 38 and write to or read from words 40 of block 38 sequentially. Port module 28 can also wrap around to a first word 40 of block 38 as it writes to or reads from block 38. A block 38 has an address that can be used to identify block 38 in a write operation or a read operation, and an offset can be used to identify a word 40 of block 38 in a write operation or a read operation. As an example, consider a packet that is 4176 bits long. The packet has been written to fifty-eight words 40, starting at word 40$f$ of block 38$a$ and continuing to word 40$k$ of block 38$d$, excluding block 38$b$. In the write operation, word 40$f$ of block 38$a$ is identified by a first address and a first offset, word 40$f$ of block 38$c$ is identified by a second address and a second offset, and word 40$f$ of block 38$d$ is identified by a third address and a third offset. The packet can also be read from stream memory 30 starting at word 40$f$ of block 38$a$ and continuing to word 40$k$ of block 38$d$, excluding block 38$b$. In the read operation, word 40$f$ of block 38$a$ can be identified by the first address and the first offset, word 40$f$ of block 38$c$ can be identified by the second address and the second offset, and word 40$f$ of block 38$d$ can be identified by the third address and the third offset.

Tag memory 32 includes multiple linked lists that can each be used, by, for example, central input control module 35, to determine a next block 38 to which first port module 28 may write and, by, for example, second port modules 28, to determine a next block 38 from which second port modules 28 may read. Tag memory 32 also includes a linked list that can be used by central agent 34 to determine a next block 38 that can be made available to a port module 28 for a write operation from port module 28 to stream memory 30, as described more fully below. Tag memory 32 includes multiple entries, at least some of which each correspond to a block 38 of stream memory 30. Each block 38 of stream memory 30 has a corresponding entry in tag memory 32. An entry in tag memory 32 can include a pointer to another entry in tag memory 32, resulting in a linked list.

Entries in tag memory 32 corresponding to blocks 38 that are available to a port module 28 for write operations from port module 28 to stream memory 30 can be linked together such that a next block 38 to which a port module 28 may write can be determined using the linked entries. When a block 38 is made available to a port module 28 for write operations from port module 28 to stream memory 30, an entry in tag memory 32 corresponding to block 38 can be added to the linked list being used to determine a next block 38 to which port module 28 may write.

A linked list in tag memory 32 being used to determine a next block 38 to which a first port module 28 may write can also be used by one or more second port modules 28 to determine a next block 38 from which to read. As an example, consider the linked list described above. A first portion of a packet has been written from first port module 28 to first block 38, a second portion of the packet has been written from first port module 28 to second block 38, and a third and final portion of the packet has been written from first port module 28 to third block 38. An end mark has also been written to third block 38 to indicate that a final portion of the packet has been written to third block 38. A second port module 28 reads from first block 38 and, while second port module 28 is reading from first block 38, uses the pointer in the first entry to determine a next block 38 from which to read. The pointer refers second port module 28 to second block 38, and, when second port module 28 has finished reading from first block 38, second port module 28 reads from second block 38. While second port module 28 is reading from second block 38, second port module 28 uses the pointer in the second entry to determine a next block 38 from which to read. The pointer refers second port module 28 to third block 38, and, when second port module 28 has finished reading from second block 38, second port module 28 reads from third block 38. Second port module 28 reads from third block 38 and, using the end mark in third block 38, determines that a final portion of the packet has been written to third block 38. While a linked list in tag memory 32 cannot be used by more than one first port module 28 to determine a next block 38 to which to write, the linked list can be used by one or more second port modules 28 to determine a next block 38 from which to read.

Different packets can have different destinations, and the order in which packets make their way through stream memory 30 need not be first in, first out (FIFO). As an example, consider a first packet received and written to one or more first blocks 38 before a second packet is received and written to one or more second blocks 38. The second packet could be read from stream memory 30 before the first packet, and second blocks 38 could become available for other write operations before first blocks 38. In particular embodiments, a block 38 of stream memory 30 to which a packet has been written can be made available to a port module 28 for a write operation from port module 28 to block 38 immediately after the packet has been read from block 38 by all port modules 28 that are designated port modules 28 of the packet. A designated port module 28 of a packet includes a port module 28 coupled to a component of system area network 10, downstream from switch core 26, that is a final or intermediate destination of the packet.

Using credits to manage write operations may offer particular advantages. For example, using credits can facilitate cut-through forwarding by switch core 26, which reduces latency, increases throughput, and reduces memory requirements associated with switch core 26. Using credits to manage write operations can also eliminate head-of-line blocking and provide greater flexibility in the distribution of memory resources among port modules 28 in response to changing load conditions at port modules 28. A credit corresponds to a block 38 of stream memory 30 and can be used by a port module 28 to write to block 38. A credit can be allocated to a port module 28 from a pool of credits, which is managed by central agent 34. Reference to a credit being allocated to a port module 28 includes a block 38 corresponding to the credit being made available to port module 28 for a write operation from port module 28 to block 38, and vice versa.

A credit in the pool of credits can be allocated to any port module 28 and need not be allocated to any particular port module 28. A port module 28 can use only a credit that is available to port module 28 and cannot use a credit that is available to another port module 28 or that is in the pool of credits. A credit is available to port module 28 if the credit has been allocated to port module 28 and port module 28 has not yet used the credit. A credit that has been allocated to port module 28 is available to port module 28 until port module 28 uses the credit. A credit cannot be allocated to more than one port module 28 at a time, and a credit cannot be available to more than one port module 28 at the same time. In particular embodiments, when a first port module 28 uses a credit to write a packet to a block 38 corresponding to the credit, the credit is returned to the pool of credits immediately after all designated port modules 28 of the packet have read the packet from block 38.

ICCA 33 includes central agent 34 and central input control module 35. Central agent 34 is operable to allocate credits to port modules 28 from the pool of credits. As an example, central agent 34 can make an initial allocation of a predetermined number of credits to a port module 28. Central agent 34 can make this initial allocation of credits to port module 28, for example, at the startup of switch core 26 or in response to switch core 26 being reset. As another example, central agent 34 can allocate a credit to a port module 28 to replace another credit that port module 28 has used. In particular embodiments, when port module 28 uses a first credit, port module 28 notifies central agent 34 that port module 28 has used the first credit, and, in response to port module 28 notifying central agent 34 that port module 28 has used the first credit, central agent 34 allocates a second credit to port module 28 to replace the first credit, if, for example, the number of blocks 38 that are being used by port module 28 does not meet or exceed an applicable limit. In particular embodiments, central agent 34 can store port-allocated credits in central input control module 35 of ICCA 33 until requested by port modules 28 after the receipt of a packet.

It should be noted that reference to a block 38 that is being used by a port module 28 includes a block 38 to which a packet has been written from port module 28 and from which all designated port modules 28 of the packet have not read the packet. By replacing, up to an applicable limit, credits used by port module 28, the number of credits available to port module 28 can be kept relatively constant and, if the load conditions at port module 28 increase, more blocks 38 can be supplied to port module 28 in response to the increase in load conditions at port module 28. A limit may be applied in certain circumstances to the number of blocks used by port module 28, which may prevent port module 28 from using too many blocks 38 and thereby use up too many shared memory resources. The limit can be controlled dynamically based on the number of credits in the pool of credits. If the number of credits in the pool of credits decreases, the limit can also decrease. The calculation of the limit and the process according to which credits are allocated to port module 28 can take place out of the critical path of packets through switch core 26, which increases the switching speed of switch core 26.

A linked list in tag memory 32 can be used by central agent 34 to determine a next credit that can be allocated to a port module 28. The elements of the linked list can include entries in tag memory 32 corresponding to blocks 38 that in turn correspond to credits in the pool of credits. As an example, consider four credits in the pool of credits. A first credit corresponds to a first block 38, a second credit corresponds to a second block 38, a third credit corresponds to a third block 38, and a fourth credit corresponds to a fourth block 38. A first entry in tag memory 32 corresponding to first block 38 includes a pointer to second block 38, a second entry in tag memory 32 corresponding to second block 38 includes a pointer to third block 38, and a third entry in tag memory 32 corresponding to third block 38 includes a pointer to fourth block 38. Central agent 34 allocates the first credit to a port module 28 and, while central agent 34 is allocating the first credit to a port module 28, uses the pointer in the first entry to determine a next credit to allocate to a port module 28. The pointer refers central agent 34 to second block 38, and, when central agent 34 has finished allocating the first credit to a port module 28, central agent 34 allocates the second credit to a port module 28. While central agent 34 is allocating the second credit to a port module 28, central agent 34 uses the pointer in the second entry to determine a next credit to allocate to a port module 28. The pointer refers central agent 34 to third block 38, and, when central agent 34 has finished allocating the second credit to a port module 28, central agent allocates the third credit to a port module 28. While central agent 34 is allocating the third credit to a port module 28, central agent 34 uses the pointer in the third entry to determine a next credit to allocate to a port module 28. The pointer refers central agent 34 to fourth block 38, and, when central agent 34 has finished allocating the third credit to a port module 28, central agent allocates the fourth credit to a port module 28.

When a credit corresponding to a block 38 is returned to the pool of credits, an entry in tag memory 32 corresponding to block 38 can be added to the end of the linked list that central agent 34 is using to determine a next credit to allocate to a port module 28. As an example, consider the linked list described above. If the fourth entry is the last element of the linked list, when a fifth credit corresponding to a fifth block 38 is added to the pool of credits, the fourth entry can be modified to include a pointer to a fifth entry in tag memory 32 corresponding to fifth block 38. Because entries in tag memory 32 each correspond to a block 38 of stream memory 30, a pointer that points to a block 38 also points to an entry in tag memory 32.

When a port module 28 receives an incoming packet, port module 28 determines whether enough credits are available to port module 28 to write the packet to stream memory 30. Port module 28 may do so, for example, by reading a counter at central agent 34 indicating the number of credits available to the port module 28 to write. Alternatively, port module 28 may receive this information automatically from central agent 34. In particular embodiments, if enough credits are available to port module 28 to write the packet to stream memory 30, port module 28 can write the packet to stream memory 30 using one or more credits. In particular embodiments, if enough credits are not available to port module 28 to write the packet to stream memory 30, port module 28 can write the packet to an input buffer and later, when enough credits are available to port module 28 to write the packet to stream memory 30, write the packet to stream memory 30 using one or more credits. As an alternative to port module 28 writing the packet to an input buffer, port module 28 can drop the packet. In particular embodiments, if enough credits are available to port module 28 to write only a portion of the packet to stream memory 30, port module 28 can write to stream memory 30 the portion of the packet that can be written to stream memory 30 using one or more credits and write one or more other portions of the packet to an input buffer. Later, when enough credits are available to port module 28 to write one or more of the other portions of the packet to stream memory 30, port module 28 can write one or more of the other portions of the packet to stream memory 30 using one or more credits. In particular embodiments, delayed cut-through forwarding, like cut-through forwarding, provides one or more advantages (such as reduced latency, reduced memory requirements, and increased throughput) over store-and-forward techniques. Reference to a port module 28 determining whether enough credits are available to port module 28 to write a packet to stream memory 30 includes port module 28 determining whether enough credits are available to port module 28 to write the entire packet to stream memory 30, write only a received portion of the packet to stream memory 30, or write at least one portion of the packet to stream memory 30, where appropriate.

In particular embodiments, the length of an incoming packet cannot be known until the entire packet has been received. In these embodiments, a maximum packet size (according to an applicable set of standards) can be used to determine whether enough credits are available to a port module 28 to write an incoming packet that has been received by port module 28 to stream memory 30. According to a set of standards published by the Institute of Electrical and Electronics Engineers (IEEE), the maximum size of an Ethernet frame is 1518 bytes. According to a de facto set of standards, the maximum size of an Ethernet frame is nine thousand bytes. As an example and not by way of limitation, consider a port module 28 that has received only a portion of an incoming packet. Port module 28 uses a maximum packet size (according to an applicable set of standards) to determine whether enough credits are available to port module 28 to write the entire packet to stream memory 30. Port module 28 can make this determination by comparing the maximum packet size with the number of credits available to port module 28. If enough credits are available to port module 28 to write the entire packet to stream memory 30, port module 28 can write the received portion of the packet to stream memory 30 using one or more credits and write one or more other portions of the packet to stream memory 30 using one or more credits when port module 28 receives the one or more other portions of the packet.

As described above, central agent 34 can monitor the number of credits available to port module 28 using a counter and provide this information to port module 28 automatically or after port module 28 requests the information. When central agent 34 allocates a credit to port module 28, central agent 34 increments the counter by an amount, and, when port module 28 notifies central agent 34 that port module 28 has used a credit, central agent 34 decrements the counter by an amount. The current value of the counter reflects the current number of credits available to port module 28, and central agent 34 can use the counter to determine whether to allocate one or more credits to port module 28. Central agent 34 can also monitor the number of blocks 38 that are being used by port module 28 using a second counter. When port module 28 notifies central agent 34 that port module 28 has written to a block 38, central agent increments the second counter by an amount and, when a block 38 to which port module 28 has written is released and a credit corresponding to block 38 is returned to the pool of credits, central agent decrements the second counter by an amount. Additionally or alternatively, central input control module 35 may also monitor the number of credits available to port modules 28 using its own counter(s).

The number of credits that are available to a port module 28 can be kept constant, and the number of blocks 38 that are being used by port module 28 can be limited. The limit can be changed in response to changes in load conditions at port module 28, one or more other port module 28, or both. In particular embodiments, the number of blocks 38 that are being used by a port module 28 is limited according to a dynamic threshold that is a function of the number of credits in the pool of credits. An active port module 28, in particular embodiments, includes a port module 28 that is using one or more blocks 38. Reference to a port module 28 that is using a block 38 includes a port module 28 that has written at least one packet to stream memory 30 that has not been read from stream memory 30 to all designated port modules 28 of the packet. A dynamic threshold can include a fraction of the number of credits in the pool of credits calculated using the following formula, in which $\alpha$ equals the number of port modules 28 that are active and $\rho$ is a parameter:

$$\frac{\rho}{1+(\rho \times \alpha)}$$

A number of credits in the pool of credits can be reserved to prevent central agent 34 from allocating a credit to a port module 28 if the number of blocks 38 that are each being used by a port module 28 exceeds an applicable limit, which can include the dynamic threshold described above. Reserving one or more credits in the pool of credits can provide a cushion during a transient period associated with a change in the number of port modules 28 that are active. The fraction of credits that are reserved is calculated using the following formula, in which $\alpha$ equals the number of active port modules 28 and $\rho$ is a parameter:

$$\frac{1}{1+(\rho \times \alpha)}$$

According to the above formulas, if one port module 28 is active and $\rho$ is two, central agent 34 reserves one third of the credits and may allocate up to two thirds of the credits to port module 28; if two port modules 28 are active and $\rho$ is one, central agent 34 reserves one third of the credits and may allocate up to one third of the credits to each port module 28 that is active; and if twelve port modules 28 are active and $\rho$ is 0.5, central agent 34 reserves two fourteenths of the credits and may allocate up to one fourteenth of the credits to each port module 28 that is active. Although a particular limit is described as being applied to the number of blocks 38 that are being used by a port module 28, the present invention contemplates any suitable limit being applied to the number of blocks 38 that are being used by a port module 28.

In particular embodiments, central input control module 35 of ICCA 33 stores the credits allocated to particular port modules 28 by central agent 34 and can manage port-allocated credits using a linked list. Central input control module 35 can forward port-allocated credits to a particular, enabled port module 28 after the port module 28 requests a credit from central input control module 35. In particular embodiments, port-allocated credits are forwarded by central input control module 35 to enabled port modules 38 through switching module 37. When a port is disabled, central input control module 35 and switching module 37 may work together to collect and release the credits allocated to the disabled port. Although the illustrated embodiment includes central input control module 35 in ICCA 33, in alternative embodiments, central input control module 35 may reside in any suitable location, such as, for example, in central agent 34 or in port modules 28 themselves.

When a first port module 28 associated with an enabled port writes a packet to stream memory 30, first port module 28 can communicate to routing module 36 through switching module 37 information from the header of the packet (such as one or more destination addresses) that routing module 36 can use to identify one or more second port modules 28 that are designated port modules 28 of the packet. First port module 28 can also communicate to routing module 36 an address of a first block 38 to which the packet has been written and an offset that together can be used by second port modules 28 to read the packet from stream memory 30. The combination of this address and offset (or any other information used to identify the location at which the contents of a packet have been stored) will be referred to herein as a "pointer." Routing module 36 can identify second port modules 28 using one or more routing tables and the information from the header of the packet and, after identifying second port modules 28, communicate the pointer to the first block 38 to each second port module 28, which second port module 28 can add to an output queue, as described more fully below. In particular embodiments, routing module 36 can communicate information to second port modules 28 through ICCA 33.

In particular embodiments, switching module 37 is coupled between port modules 28 and both routing module 36 and ICCA 33 to facilitate the communication of information between port modules 28 and ICCA 33 or routing module 36 when a port is enabled. When a port is disabled, switching module 37 is operable to facilitate the collection and release of port-allocated credits associated with the disabled port. It should be noted that, although a single switching module 37 is illustrated, switching module 37 may represent any suitable number of switching modules. In addition, switching module 37 may be shared by any suitable number of port modules 28. Furthermore, the functionality of switching module 37 may be incorporated in one or more of the other components of the switch.

An output port module 28 can include one or more output queues that are used to queue pointers for packets that have been written to stream memory 30 and that are to be communicated from switch core 26 through the associated port module 28. When a packet is written to stream memory 30, a pointer associated with the packet is added to an output queue of each port module 28 from which the packet is to be communicated. As described further below in conjunction with FIGS. 6A and 6B, an output queue structure of a designated port module 28 may be bypassed in some circumstances.

In particular embodiments, a port module 28 includes a memory structure that can include one or more linked lists that port module 28 can use, along with one or more registers, to determine a next packet to read from stream memory 30. The memory structure includes multiple entries, at least some of which each correspond to a block 38 of stream memory 30. Each block 38 of stream memory 30 has a corresponding entry in the memory structure. An entry in the memory structure can include a pointer to another entry in the memory structure, resulting in a linked list. A port module 28 also includes one or more registers that port module 28 can also use to determine a next packet to read from stream memory 30. A register includes a write pointer, an offset, and a read pointer. The write pointer can point to a first block 38 to which a first packet has been written, the offset can indicate a first word 40 to which the first packet has been written, and the read pointer can point to a first block 38 to which a second packet (which could be the same packet as or a packet other than the first packet) has been written. Because entries in the memory structure each correspond to a block 38 of stream memory 30, a pointer that points to a block 38 also points to an entry in the memory structure.

Port module 28 can use the read pointer to determine a next packet to read from stream memory 30 (corresponding to the "first" packet above). Port module 28 can use the write pointer to determine a next entry in the memory structure to which to write an offset. Port module 28 can use the offset to determine a word 40 of a block 38 at which to start reading from block 38, as described further below. Port module 28 can also use the read pointer and the write pointer to determine whether more than one packet is in the output queue. If output queue is not empty and the write pointer and the read pointer both point to the same block 38, there is only one packet in the output queue. If there is only one packet in the output queue, port module 28 can determine a next packet to read from stream memory 30 and read the next packet from stream memory 30 without accessing the memory structure.

If a first packet is added to the output queue when there are no packets in the output queue, (1) the write pointer in the register is modified to point to a first block 38 to which the first packet has been written, (2) the offset is modified to indicate a first word 40 to which the first packet has been written, and (3) the read pointer is also modified to point to first block 38 to which the first packet has been written. If a second packet is added to the output queue before port module 28 reads the first packet from stream memory 30, (1) the write pointer is modified to point to a first block 38 to which the second packet has been written, (2) the offset is written to a first entry in the memory structure corresponding to first block 38 to which the first packet has been written and then modified to indicate a first word 40 to which the second packet has been written, and (3) a pointer in the first entry is modified to point to first block 38 to which the second packet has been written. The read pointer is left unchanged such that, after the second packet is added to the output queue, the read pointer still points to first block 38 to which the first packet has been written. As described more fully below, the read pointer is changed when port module 28 reads a packet in the output queue from stream memory 30. If a third packet is added to the output queue before port module 28 reads the first packet and the second packet from stream memory 30, (1) the write pointer is modified to point to a first block 38 to which the third packet has been written, (2) the offset is written to a second entry in the memory structure corresponding to first block 38 to which the second packet has been written and modified to indicate a first word 40 to which the third packet has been written, and (3) a pointer in the second entry is modified to point to first block 38 to which the third packet has been written. The read pointer is again left unchanged such that, after the third packet is added to the output queue, the read pointer still points to first block 38 to which the first packet has been written. Port module 28 can use the output queue to determine a next packet to read from stream memory 30.

If a port module 28 includes more than one output queue, an algorithm can be used for arbitration among the output queues. Arbitration among multiple output queues can include determining a next output queue to use to determine a next packet to read from stream memory 30. Arbitration among multiple output queues can also include determining how many packets in a first output queue to read from stream memory 30 before using a second output queue to determine a next packet to read from stream memory 30. The present invention contemplates any suitable algorithm for arbitration among multiple output queues. As an example and not by way of limitation, according to an algorithm for arbitration among multiple output queues of a port module 28, port module 28 accesses output queues that are not empty in a series of rounds. In a round, port module 28 successively accesses the output queues in a predetermined order and, when port module 28 accesses an output queue, reads one or more packets in the output queue from stream memory 30. The number of packets that port module 28 reads from an output queue in a round can be the same as or different from the number of packets that port module 28 reads from each of one or more other output queues of port module 28 in the same round. In particular embodiments, the number of packets that can be read from an output queue in a round is based on a quantum value that defines an amount of data according to which more packets can be read from the output queue if smaller packets are in the output queue and fewer packets can be read from the output queue if larger packets are in the output queue, which can facilitate fair sharing of an output link of port module 28.

Figure 5:
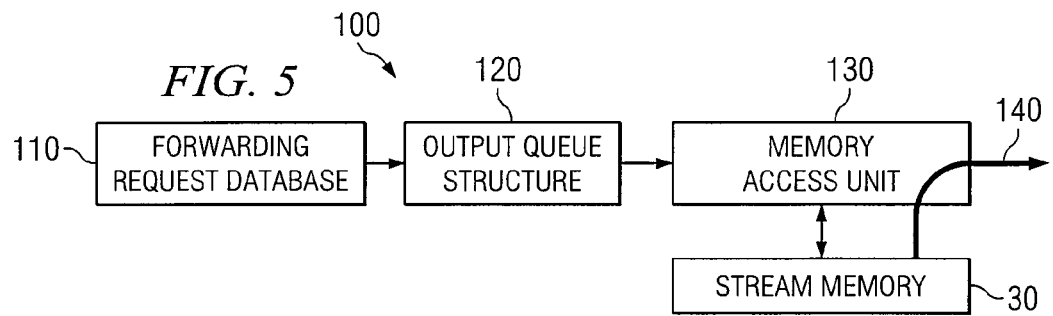
FIG. 5 is a block diagram illustrating an example output module.

FIG. 5 is a block diagram illustrating an example output module 100. Output module 100 is used in many typical switches to output packets. Output module 100 comprises forwarding request database 110, output queue structure 120, memory access unit 130, and stream memory 30. Forwarding request database 110 is operable to receive information associated with a packet from the input port module 28 that received the packet. Forwarding request database 110 is further operable to use this information to identify output port(s) from which the packet is to be communicated from the switch. Forwarding request database 110 is also operable to generate and send forwarding requests to suitable output queue structures 120, which may reside, for example, at output port modules 28. Forwarding requests include pointers to, or any other suitable identifiers of, packets stored in stream memory that are to be communicated from a particular output port(s) and that have not been accessed and output by the particular output port. Forwarding request database 110 may reside in any suitable location in switch core 26. In particular embodiments, forwarding request database 110 may reside at routing module 36. In alternative embodiments, forwarding request database 110 may reside in a particular output port module 28.

After receiving forwarding requests from forwarding request database 110, output queue structure 120 is operable to queue the forwarding requests and arbitrate among the queued requests to select a forwarding request to send to memory access unit 130. Output queue structure 120 may comprise any suitable number of queues corresponding to one or more variables (for example, QoS). Output queue structure 120 may reside in any suitable location in switch core 26, such as, for example, in an output port module 28. Alternatively, output queue structure 120 may reside centrally, such as, for example, in central agent 34.

Memory access unit 130 is operable to receive selected forwarding requests from output queue structure 120, access the packets associated with the selected forwarding requests from stream memory 30, and output these packets from the associated output port. Memory access unit 130 may reside in any suitable location in switch 26, such as, for example, in its associated output port module 28. Alternatively, memory access unit 130 may reside centrally, such as, for example, in central agent 34. Arrow 140 represents a packet being output from the switch. The packet travels from stream memory 30 and through memory access unit 130, before being communicated from an associated output port.

In operation, a port module 28 of a switch receives a packet and stores the packet in stream memory. The port module 28 forwards information associated with the packet (such as the destination address) to forwarding request database 110, which may reside, for example, at routing module 36. Forwarding request database 110 uses this information to identify output port(s) from which the packet is to be forwarded. After identifying the output port(s), forwarding request database 110 generates and sends forwarding requests to the output queue structure(s) 120 associated with the identified output port(s). An output queue structure 120 may reside, for example, at the output port module 28 associated with an identified output port. An output queue structure 120 queues received forwarding requests in an appropriate queue and arbitrates among the queued requests in the different queues to select a forwarding request to send to memory access unit 130. Memory access unit 130 receives the selected forwarding requests from output queue structure 120 and accesses the packets associated with the selected forwarding requests in memory access unit 130. Memory access unit 130 then outputs these packets through an associated output port.

Advantages of using typical output module 100 include a strict adherence to output queue priorities. However, there may be circumstances in which the benefits arising from strict adherence to output queue priorities are outweighed by increased latency that may arise from using an output queue structure. For example, where a relatively small number of packets are pending for transmission from a port, reduced latency may be achieved by bypassing the queue structure. There may be other circumstances as well where reduced latency is more important than adherence to a strict priority scheme (regardless of the number of packets pending). In any of these circumstances, example output module 100 may offer an inefficient solution for handling packets, as it requires queuing of all requests associated with the packets, thereby increasing latency. A need thus exists for a different output module solution.

Figure 6:
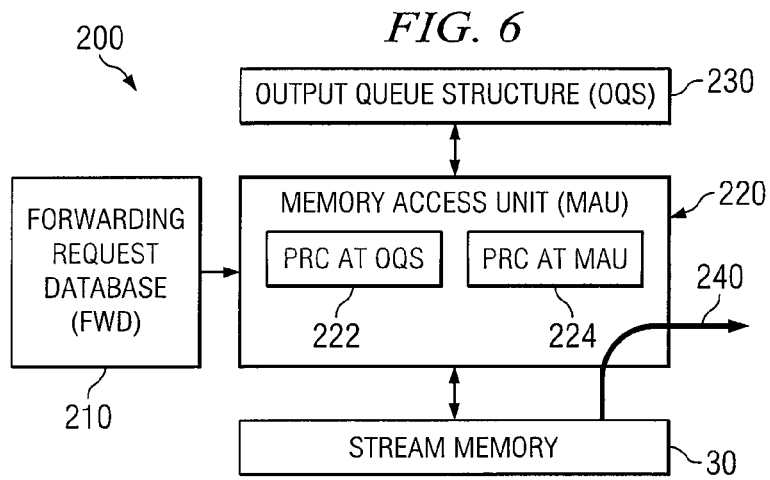
FIG. 6 is a block diagram illustrating another example output module according to one embodiment of the present invention.

FIG. 6 is a block diagram illustrating another example output module 200 according to one embodiment of the present invention. Output module 200 may reduce latency of packets through a switch by facilitating the bypass of output queue structure 230 in particular circumstances. When strict priority handling is desired, the bypass of output queue structure 230 may be disabled in particular embodiments.

Output module 200 comprises forwarding request database 210, memory access unit 220, output queue structure 230, and stream memory 30. Like forwarding request database 110 of FIG. 5, forwarding request database 210 is operable to receive information associated with a packet (such as the packet's destination address) from the input port module 28 that received the packet. Forwarding request database 210 is further operable to use this information to identify output port(s) from which the packet is to be communicated from the switch. Forwarding request database 210 is also operable to generate and send forwarding requests to suitable memory access units 220, which may reside, for example, at output port modules 28. Forwarding request database 210 may reside in any suitable location in switch core 26. In particular embodiments, forwarding request database 210 may reside at routing module 36. In alternative embodiments, forwarding request database 110 may reside in a particular output port module 28.

Memory access unit 220 may comprise any suitable memory access unit operable to receive new forwarding requests directly from forwarding request database 210 and to manage whether new forwarding requests are to bypass output queue structure 230. To manage the bypass of output queue structure 230, memory access unit 220 is operable to selectively forward the new forwarding requests to output queue structure 230 or place them in its own request buffer (not illustrated). Memory access unit is further operable to facilitate the consumption of received forwarding requests, which at times may occur through interaction with output queue structure 230. The manner in which memory access unit 220 manages the bypass of output queue structure 230 is discussed further below in conjunction with FIG. 7. The manner in which memory access unit 220 and output queue structure 230 may interact to consume received forwarding requests is discussed further below in conjunction with FIG. 8.

Memory access unit 220 may comprise a request buffer (not illustrated), a request counter 222 for requests pending at output queue structure 230, and a request counter 224 for requests pending at memory access unit 220. The request buffer is operable to store forwarding requests sent directly from forwarding request database 210 or retrieved from output queue structure 230. The requests in request buffer may be ordered by memory access unit 220 in any suitable manner. For example, the requests may be ordered in a first-in-first-out (FIFO) or other suitable manner. When bypassing output queue structure 230, memory access unit 220 may process requests substantially more quickly using the request buffer. However, because the request buffer may be substantially smaller than output queue structure 230, output queue structure 230 may only be bypassed in particular circumstances (i.e., when the number of pending requests is relatively small).

Request counter 222 may comprise any suitable counter operable to maintain a count of the number of forwarding requests pending in output queue structure 230. Memory access unit 220 may increment counter 222 when memory access unit 220 forwards new requests to output queue structure 230 and decrement counter 222 when memory access unit 220 receives queued requests from output queue structure 230. It should be noted that request counter 222 may be replaced by any other suitable component operable to maintain a count of the number of pending requests in output queue structure 230.

Request counter 224 may comprise any suitable counter operable to maintain a count of the number of forwarding requests pending in the request buffer in memory access unit 220. Memory access unit 220 may increment counter 224 when memory access unit 220 receives new requests from forwarding database 210 and queued requests from output queue structure 230. Memory access unit 220 may decrement counter 224 when memory access unit 220 forwards new requests to output queue structure 230 and when memory access unit 220 consumes requests. In this way, counter 224 is operable to indicate whether the number of forwarding requests in the request buffer in memory access unit 220 is below a certain threshold (i.e., whether the number has reached the maximum number storable by the request buffer or some other lower threshold). It should be noted that counter 224 may be replaced by any other suitable component operable to indicate whether the number of forwarding requests in the request buffer in memory access unit 220 is below a certain threshold (i.e., whether the request buffer is full or has reached some lower threshold). It should further be noted that "consuming" a request refers to accessing the associated packet in stream memory 30 and forwarding the packet from the associated output port.

After storing and ordering received requests in its request buffer, memory access unit 220 is operable to access the associated packets stored in stream memory 30 in the particular order determined by the request buffer. Memory access unit 220 is further operable to forward the associated packets from the associated output port. Arrow 240 represents a packet being output from the switch. The packet travels from stream memory 30 and through memory access unit 220, before being communicated from an associated output port.

Output queue structure 230 may comprise any suitable output queue structure operable to receive forwarding requests from memory access unit 220, queue received forwarding requests in an appropriate queue using any suitable prioritization scheme, and arbitrate among the queued requests using any suitable arbitration scheme. Output queue structure 230 may comprise any suitable number of queues corresponding to one or more variables (for example, QoS). Output queue structure 230 may reside in any suitable location in switch core 26, such as, for example, in an output port module 28. Alternatively, output queue structure 230 may reside centrally, such as, for example, in central agent 34.

In operation, a port module 28 of a switch receives a packet and stores the packet in stream memory 30. The port module 28 forwards information associated with the packet (such as the destination address) to forwarding request database 210. Forwarding request database 210 uses this information to identify output port(s) from which the packet is to be forwarded. After identifying the output port(s), forwarding request database 210 generates and sends forwarding requests to the memory access unit(s) 220 associated with the identified output port(s). Memory access unit 220 receives the new forwarding requests from forwarding request database 210 and manages the bypass of output queue structure 230 using counters 222 and 224, and as described further below in conjunction with FIG. 7. Generally, if it is determined using counter 224 that the number of forwarding requests in the request buffer is below a certain first threshold (i.e., the maximum number storable in the request buffer or some other suitable lesser number) and if it is determined using counter 222 that the number of forwarding requests in the output queue structure 230 is below a certain second threshold (i.e., a threshold of one such that structure 230 is empty), memory access unit 230 places the new forwarding requests in its request buffer. If the request buffer is full or if output queue structure 230 is not empty, memory access unit 220 forwards new forwarding requests to output queue structure 230. If output queue structure 230 is not bypassed, output queue structure 230 queues received requests suitably and selects from the queued requests. Memory access unit 230 retrieves selected forwarding requests from output queue structure 230 to place in its request buffer (if the request buffer is not full). Whether or not output queue structure is bypassed, forwarding requests in the request buffer are ordered suitably and consumed according to their order in the request buffer.

When the output queue structure bypass is disabled, memory access unit 220 receives forwarding requests from forwarding request database 210, forwards these requests to output queue structure 230, receives the requests in the order determined by output queue structure 230, places the requests received from output queue structure 230 in its request buffer, and facilitates the transmission of the associated packets in the order determined by output queue structure 230. The output queue structure bypass may be disabled, for example, when the number of pending forwarding requests increases above a threshold (i.e., where latency would no longer be substantially reduced) or when strict priority rules are enforced. Enablement and disablement of the bypass may occur in any suitable manner, including, for example, dynamically. Any suitable component may disable or enable the bypass, such as, for example, central agent 34. If disablement or enablement of the bypass is based on the number of pending requests in output queue structure 230, forwarding request database 210, or memory access unit 220, suitable information may be communicated from one or more of these components to the component disabling or enabling the bypass in order to suitably enable or disable the bypass.

Figure 7:
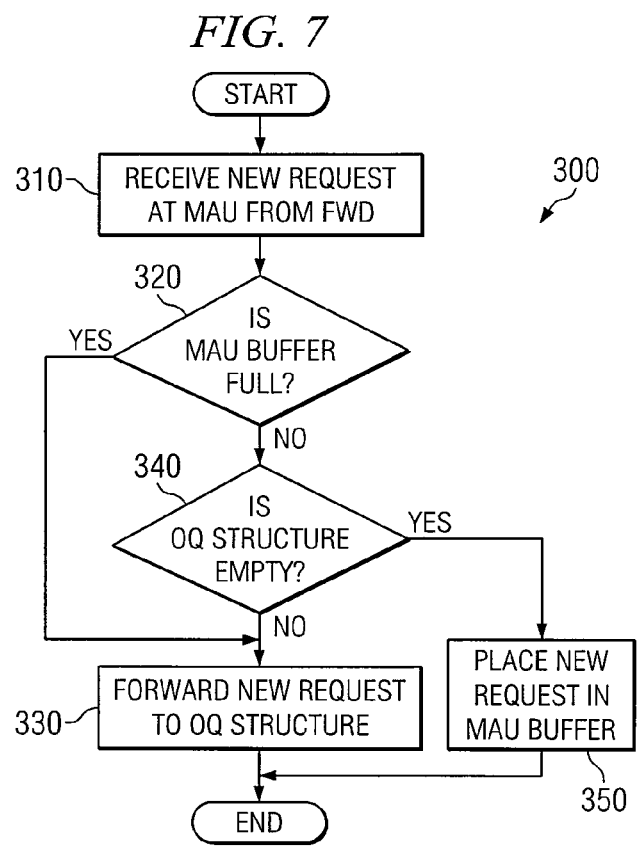
FIG. 7 is a flowchart illustrating an example method for managing the bypass of an output queue structure according to a particular embodiment of the invention.

FIG. 7 is a flowchart illustrating an example method 300 for managing the bypass of an output queue structure according to a particular embodiment of the invention. In particular embodiments, method 300 may be performed by a memory access unit in a switch, such as, for example, memory access unit 220 described above. Alternatively, method 300 may be performed by any suitable component or combination of components. In general, if the number of forwarding requests in a request buffer (discussed above) in the memory access unit is below a certain first threshold (i.e., below any suitable number such as the maximum number storable in the request buffer such that the request buffer is not full) and the number of forwarding requests in an output queue structure is below a certain second threshold (i.e., below a threshold of one such that the output queue structure is empty), the memory access unit places the new forwarding requests in its request buffer, bypassing the output queue structure. If the request buffer is at or above the first threshold (i.e., the buffer is full) or if the output queue structure is at or above the second threshold (i.e., the structure is not empty), the memory access unit forwards the new forwarding requests to the output queue structure. In alternative embodiments, the bypass of the output queue structure may be managed in any other suitable manner.

Method 300 begins at step 310, where a new forwarding request is received. The new forwarding request may be received, for example, at a memory access unit (i.e., unit 220) from a forwarding request database (i.e., database 210). A memory access unit is represented in the flowchart as "MAU," and a forwarding request database is represented in the flowchart as "FWD."

At step 320, a determination is made whether the request buffer in the memory access unit is full. The request buffer may be, for example, the request buffer described above in conjunction with FIG. 6. The determination about whether the request buffer is full may be made in particular embodiments using a counter (i.e., counter 224). In alternative embodiments, the determination may be made in any other suitable manner.

If the request buffer in the memory access unit is full, the method proceeds to step 330. At step 330, the new forwarding request is sent to an output queue structure (i.e., structure 230). The output queue structure may then suitably process the new forwarding request. The memory access unit may retrieve the new forwarding request from the output queue structure after, for example, the memory access unit consumes the forwarding requests in its request buffer and retrieves any other forwarding requests in the output queue structure queued ahead of the new forwarding request. A manner in which the memory access unit and output queue structure may interact to consume received forwarding requests is discussed further below in conjunction with FIG. 8.

If, at step 320, a determination is made that the request buffer in the memory access unit is not full, a determination is made whether the output queue structure is empty at step 340. The determination about whether the output queue structure is empty may be made in particular embodiments using a counter (i.e., counter 222 in memory access unit 220). In alternative embodiments, the determination may be made in any other suitable manner.

If the output queue structure is empty, the method proceeds to step 350. At step 350, the new forwarding request is placed in the request buffer in the memory access unit. The forwarding requests are ordered in any suitable manner in the request buffer (and not necessarily in a FIFO manner). The memory access unit consumes the forwarding requests in its request buffer in the order determined by the request buffer, as discussed further below in conjunction with FIG. 8. If, at step 340, a determination is made that the output queue structure is not empty, the method proceeds to step 330, described above. In this manner, new requests do not bypass the output queue structure if forwarding requests remain in the output queue structure. New requests also do not bypass the output queue structure if the request buffer in the memory access unit is full.

FIG. 8 is a flowchart illustrating an example method 400 for managing the consumption of forwarding requests according to a particular embodiment of the invention. In particular embodiments, the consumption of forwarding requests in a memory access unit (i.e., unit 220) and/or an output queue structure (i.e., unit 230) may be managed. Method 400 allows the memory access unit to retrieve any selected forwarding requests from the output queue structure to place in its request buffer (if the request buffer is not full) and to consume forwarding requests in the request buffer according to their order in the request buffer. Method 400 may be used before, in conjunction with, or after method 300 is performed, as appropriate.

Method 400 begins at step 410, where a determination is made whether the request buffer in the memory access unit is empty. The determination about whether the request buffer is empty may be made using, for example, a counter (i.e., counter 224). In alternative embodiments, the determination may be made in any other suitable manner.

If the request buffer is not empty, the next forwarding request in the request buffer is consumed at step 420. Method 400 then proceeds to step 430. As noted above, consuming a forwarding request generally refers to accessing the associated packet in stream memory 30 and forwarding the packet from the associated output port.

If, at step 410, a determination is made that the request buffer is empty (or after step 420), method 400 proceeds to step 430. At step 430, a determination is made whether the output queue structure is empty. The determination about whether the output queue structure is empty may be made using, for example, a counter (i.e., counter 222). In alternative embodiments, the determination may be made in any other suitable manner.

If a determination is made that the output queue structure is empty at step 430, method 400 returns to step 410. If a determination is made that the output queue structure is not empty at step 430, method 400 proceeds to step 440. At step 440, the next forwarding request in the output queue structure is retrieved by the memory access unit. The next request in the output queue structure may be, for example, the forwarding request that has been selected from the queue structure (after being suitably processed).

After step 440, method 400 proceeds to step 450, where the retrieved request is placed in the request buffer in the memory access unit. The retrieved request is ordered in the request buffer in any suitable manner and is consumed according to the order determined by the request buffer. In this manner, method 400 allows the memory access unit to retrieve any selected forwarding requests from the output queue structure to place in its request buffer (if the request buffer is not full) and to consume forwarding requests in the request buffer according to their order in the request buffer.

Modifications, additions, or omissions may be made to the systems and methods described without departing from the scope of the disclosure. The components of the systems and methods described may be integrated or separated according to particular needs. Moreover, the operations of the systems and methods described may be performed by more, fewer, or other components without departing from the scope of the present disclosure.

FIG. 9 is a block diagram illustrating another example output module 500 according to another embodiment of the present invention. Like output module 200, output module 500 may reduce latency of packets through a switch by facilitating the bypass of output queue structure 530 in particular circumstances. When strict priority handling is desired, the bypass of output queue structure 530 may be disabled in particular embodiments.

Output module 500 comprises forwarding request database 510, memory access unit 520, output queue structure 530, and stream memory 30. Forwarding request database 510 may reside in a central location in switch core 26 (i.e., routing module 36) or in a particular output port module 28. Like forwarding request database 210 of FIG. 6, forwarding request database 510 is operable to receive information associated with a packet (such as the packet's destination address) from the input port module 28 that received the packet. Forwarding request database 510 is further operable to use this information to identify output port(s) from which the packet is to be communicated from the switch. Using this information, forwarding request database 510 is operable to generate new forwarding requests.

Unlike forwarding request database 210, forwarding request database 510 is operable to selectively send the new forwarding requests directly to memory access unit 520 or directly to output queue structure 530, thereby managing the bypass of output queue structure 530. Forwarding request database 510 may be operable to manage the bypass of output queue structure 530 in the manner discussed further below in conjunction with FIG. 10. In particular embodiments, if it is determined by accessing counter 522 (described below) that the number of forwarding requests in the request buffer in memory access unit 520 is below a certain first threshold (i.e., any suitable number such as the maximum number storable in the request buffer) and if it is determined by using counter 512 (described below) that the number of forwarding requests in output queue structure 530 is below a certain second threshold (i.e., below one such that structure 530 is empty), forwarding request database 510 sends the new forwarding requests directly to memory access unit 520 (to be placed in its request buffer). If the request buffer is at or above the certain first threshold (i.e., the buffer is full) or if output queue structure 530 is at or above the certain second threshold (i.e., structure 530 is not empty), forwarding request database 510 sends the new forwarding requests to output queue structure 530. In alternative embodiments, the bypass of output queue structure may be managed in any other suitable manner. The consumption of forwarding requests may be managed according to method 400, described above in conjunction with FIG. 8.

Unlike forwarding request database 210, forwarding request database 510 also comprises request counter 512. Request counter 512 may comprise any suitable counter operable to maintain a count of the number of forwarding requests pending in output queue structure 530. Forwarding request database 510 may increment counter 512 when forwarding request database 510 sends new requests to output queue structure 530. Forwarding request database 510 may decrement counter 512 when forwarding request database 510 is notified by memory access unit 220 that memory access unit 220 has retrieved a forwarding request from output queue structure 530 (or when forwarding request database 510 otherwise accesses this information directly from the output queue structure 530). It should be noted that request counter 512 may be replaced by any other suitable component operable to maintain a count of the number of pending requests in output queue structure 530. It should also be noted that, in particular embodiments, forwarding request database 510 is operable to access counter 522 (described below) in memory access unit 520 to determine whether the request buffer in memory access unit 520 is full. Alternatively, forwarding request database 510 may determine whether the request buffer is full using any other suitable component in any other suitable manner.

Memory access unit 520 may comprise any suitable memory access unit operable to receive forwarding requests directly from forwarding request database 510, retrieve forwarding requests directly from output queue structure 530, and manage the consumption of received and retrieved forwarding requests according to method 400, described above in conjunction with FIG. 8. It should be noted, however, that at step 430 of FIG. 8, memory access unit 520 may make a determination whether output queue structure 530 is empty by accessing counter 512 in forwarding request database 510. Memory access unit 520 may also make this determination in any other suitable manner.

Memory access unit 520 may comprise a request buffer (not illustrated) and a request counter 522 for counting the requests pending in the request buffer. The request buffer is operable to store forwarding requests sent directly from forwarding request database 510 or retrieved from output queue structure 530. The requests in request buffer may be ordered by memory access unit 520 in any suitable manner. For example, the requests may be ordered in a first-in-first-out (FIFO) or other suitable manner. When output queue structure 530 is bypassed, forwarding requests may be processed substantially more quickly using only the request buffer. However, because the request buffer may be substantially smaller than output queue structure 530, output queue structure 530 may only be bypassed in particular circumstances (i.e., when the number of pending requests is less than or equal to the size of the request buffer).

Request counter 522 may comprise any suitable counter operable to maintain a count of the number of forwarding requests pending in the request buffer in memory access unit 520. Memory access unit 520 may increment counter 522 when memory access unit 520 receives new requests from forwarding database 510 and retrieves requests from output queue structure 530. Memory access unit 520 may decrement counter 522 when memory access unit 520 consumes requests. In this way, counter 522 is operable to indicate whether the request buffer in memory access unit 520 is full. This information may be accessed and used by memory access unit 520 and by forwarding request database 510. It should be noted that counter 522 may be replaced by any other suitable component operable to indicate whether the request buffer in memory access unit 520 is full.

After storing and ordering received requests in its request buffer, memory access unit 520 is operable to access the associated packets stored in stream memory 30 in the particular order determined by the request buffer. Memory access unit 520 is further operable to forward the associated packets from the associated output port. Arrow 540 represents a packet being output from the switch. The packet travels from stream memory 30 and through memory access unit 520, before being communicated from an associated output port.

Output queue structure 530 may comprise any suitable output queue structure operable to receive new forwarding requests from forwarding request database 510, queue received forwarding requests in an appropriate queue using any suitable prioritization scheme, and arbitrate among the queued requests using any suitable arbitration scheme. Output queue structure 530 may comprise any suitable number of queues corresponding to one or more variables (for example, QoS). Forwarding requests selected for transmission in output queue structure 530 may be retrieved in any suitable manner by memory access unit 520. Output queue structure 530 may reside in any suitable location in switch core 26, such as, for example, in an output port module 28. Alternatively, output queue structure 530 may reside centrally, such as, for example, in central agent 34.

In operation, a port module 28 of a switch receives a packet and stores the packet in stream memory 30. The port module 28 forwards information associated with the packet (such as the destination address) to forwarding request database 510. Forwarding request database 510 uses this information to identify output port(s) from which the packet is to be forwarded. After identifying the output port(s), forwarding request database 510 generates forwarding requests to send to the output port(s). Forwarding request database 510 selectively sends forwarding requests directly to memory access unit 520 or directly to output queue structure 530 associated with an identified output port, thereby managing the bypass of output queue structure 530. In particular embodiments, if it is determined by accessing counter 522 that the number of forwarding requests in request buffer in memory access unit 520 is below a certain first threshold (i.e., such that request buffer is not full) and if it is determined using counter 512 that the number of forwarding requests in output queue structure 530 is below a certain second threshold (i.e., such that output queue structure 530 is empty), forwarding request database 510 sends the new forwarding requests directly to memory access unit 520 (to be placed in its request buffer). If the number of forwarding requests in request buffer is at or above the certain first threshold (i.e., such that request buffer is full) or if output queue structure 530 is at or above the certain second threshold (i.e., such that output queue structure is not empty), forwarding request database 510 sends new forwarding requests to output queue structure 530. Output queue structure 530 processes received forwarding requests in any suitable manner. Memory access unit 520 receives forwarding requests directly from forwarding request database 510, retrieves forwarding requests directly from output queue structure 530, places the received and retrieved forwarding requests in any suitable order in its request buffer, and manages the consumption of received and retrieved forwarding requests according to method 400, described above in conjunction with FIG. 8. It should be noted, however, that at step 430 of FIG. 8, memory access unit 520 may make a determination whether output queue structure 530 is empty by accessing counter 512 in forwarding request database 510.

When the output queue structure bypass is disabled, forwarding request database 510 sends all forwarding requests directly to output queue structure 530. Memory access unit 520 retrieves the forwarding requests from output queue structure 530 in the order determined by output queue structure 530, places the retrieved requests in its request buffer, and facilitates the transmission of the associated packets in the order determined by output queue structure 530. The output queue structure bypass may be disabled, for example, when the number of pending forwarding requests increases above a threshold (i.e., where latency would no longer be substantially reduced) or when strict priority rules are enforced. Enablement and disablement of the bypass may occur in any suitable manner, including, for example, dynamically. Any suitable component may disable or enable the bypass, such as, for example, central agent 34. If disablement or enablement of the bypass is based on the number of pending requests in output queue structure 530, forwarding request database 510, or memory access unit 520, suitable information may be communicated from one or more of these components to the component disabling or enabling the bypass in order to suitably enable or disable the bypass.

FIG. 10 is a flowchart illustrating another example method 600 for managing the bypass of an output queue structure according to another particular embodiment of the invention. In particular embodiments, method 600 may be performed by a forwarding request database in a switch, such as, for example, forwarding request database 510 described above. Alternatively, method 600 may be performed by any suitable component or combination of components. In general, if the request buffer (discussed above) in the memory access unit is not full and the output queue structure is empty, the forwarding request database sends the new forwarding requests to the request buffer in the memory access unit, bypassing the output queue structure. If the request buffer is full or if the output queue structure is not empty, the forwarding request database sends the new forwarding requests to the output queue structure. In alternative embodiments, the bypass of the output queue structure may be managed in any other suitable manner.

Method 600 begins at steps 610 and 620, where a determination is made on where to send a new forwarding request by determining whether the request buffer in the memory access unit is full. The determination about where to send the new forwarding request may be made by a forwarding request database (i.e., database 510). The request buffer may be, for example, the request buffer described above in conjunction with FIG. 9. In particular embodiments, the determination about whether the request buffer in the memory access unit is full may be made by accessing a suitable counter (i.e., counter 522 in memory access unit 520). In alternative embodiments, the determination may be made in any other suitable manner.

If the request buffer in the memory access unit is full, the method proceeds to step 630. At step 630, the new forwarding request is sent to an output queue structure (i.e., structure 530). The output queue structure may then suitably process the new forwarding request. The memory access unit may retrieve the new forwarding request from the output queue structure after, for example, the memory access unit consumes the forwarding requests in its request buffer and retrieves any other forwarding requests in the output queue structure queued ahead of the new forwarding request. A manner in which the memory access unit and output queue structure may interact to consume received forwarding requests is discussed above in conjunction with FIG. 8. It should be noted, however, that at step 430 of FIG. 8, the memory access unit may make a determination whether the output queue structure is empty by accessing a counter (i.e., counter 512) in the forwarding request database.

If, at step 620, a determination is made that the request buffer in the memory access unit is not full, a determination is made whether the output queue structure is empty at step 640. The determination about whether the output queue structure is empty may be made in particular embodiments using a counter (i.e., counter 512 in forwarding request database 510). In alternative embodiments, the determination may be made in any other suitable manner.

If the output queue structure is empty, the method proceeds to step 650. At step 650, the new forwarding request is sent to the memory access unit and placed in the request buffer in the memory access unit. The forwarding requests are ordered in any suitable manner in the request buffer (and not necessarily in a FIFO manner). The memory access unit consumes the forwarding requests in its request buffer in the order determined by the request buffer, as discussed above in conjunction with FIG. 8. If, at step 640, a determination is made that the output queue structure is not empty, the method proceeds to step 630, described above. In this manner, new requests do not bypass the output queue structure if forwarding requests remain in the output queue structure. New requests also do not bypass the output queue structure if the request buffer in the memory access unit is full. In particular embodiments, method 600 may be used before, in conjunction with, or after method 400 is performed, as appropriate.

Modifications, additions, or omissions may be made to the systems and methods described without departing from the scope of the disclosure. The components of the systems and methods described may be integrated or separated according to particular needs. Moreover, the operations of the systems and methods described may be performed by more, fewer, or other components without departing from the scope of the present disclosure.

Although the present disclosure has been described with several embodiments, sundry changes, substitutions, variations, alterations, and modifications can be suggested to one skilled in the art, and it is intended that the disclosure encompass all such changes, substitutions, variations, alterations, and modifications falling within the spirit and scope of the appended claims.

What is claimed is:

1. A method for bypassing an output queue structure of a switch, comprising:
   receiving a packet at an input port of a switch;
   storing the packet in a memory of the switch;
   generating a forwarding request associated with the stored packet and with a particular output port of the switch, the forwarding request identifying the location in the memory of the stored packet;
   determining whether to cause the forwarding request to bypass an output queue structure associated with the particular output port;
   using the forwarding request, retrieving from the memory the packet associated with the forwarding request; and
   sending the retrieved packet from the particular output port.

2. The method of claim 1, wherein determining whether to cause the forwarding request to bypass the output queue structure comprises determining the number of forwarding requests pending in a request buffer in a memory access unit associated with the particular output port; and
   the method further comprising causing the forwarding request to bypass the output queue structure if the number of forwarding requests pending in the request buffer is below a first threshold.

3. The method of claim 2, wherein the first threshold is less than or equal to the maximum number of forwarding requests storable in the request buffer.

4. The method of claim 2, wherein determining whether to cause the forwarding request to bypass the output queue structure further comprises determining the number of forwarding requests pending at the output queue structure; and
the method further comprising causing the forwarding request to bypass the output queue structure if the number of forwarding requests pending at the output queue structure is below a second threshold.

5. The method of claim 4, wherein the second threshold is one.

6. The method of claim 1, wherein a determination is made to cause the forwarding request not to bypass the output queue structure, the method further comprising:
sending the forwarding request to the output queue structure;
processing the forwarding request in the output queue structure; and
selecting the forwarding request at the output queue structure.

7. The method of claim 1, further comprising:
before retrieving from the memory the packet associated with the forwarding request, placing the forwarding request in a request buffer in a memory access unit associated with the particular output port, the request buffer comprising a plurality of forwarding requests;
ordering the plurality of forwarding requests at the request buffer; and
selecting the forwarding request at the request buffer.

8. The method of claim 1, further comprising:
before retrieving from the memory the packet associated with the forwarding request, placing the forwarding request in a request buffer in a memory access unit associated with the particular output port, the request buffer comprising a plurality of forwarding requests;
processing the plurality of forwarding requests in a first in first out manner at the request buffer; and
selecting the forwarding request at the request buffer.

9. Logic encoded in a computer-readable medium, the logic operable when executed to:
receive a packet at an input port of a switch;
store the packet in a memory of the switch;
generate a forwarding request associated with the stored packet and with a particular output port of the switch, the forwarding request identifying the location in the memory of the stored packet;
determine whether to cause the forwarding request to bypass an output queue structure associated with the particular output port;
using the forwarding request, retrieve from the memory the packet associated with the forwarding request; and
send the retrieved packet from the particular output port.

10. The logic of claim 9, wherein determining whether to cause the forwarding request to bypass the output queue structure comprises determining the number of forwarding requests pending in a request buffer in a memory access unit associated with the particular output port; and
the logic is further operable when executed to cause the forwarding request to bypass the output queue structure if the number of forwarding requests pending in the request buffer is below a first threshold.

11. The logic of claim 10, wherein the first threshold is less than or equal to the maximum number of forwarding requests storable in the request buffer.

12. The logic of claim 10, wherein determining whether to cause the forwarding request to bypass the output queue structure further comprises determining the number of forwarding requests pending at the output queue structure; and
the logic is further operable when executed to cause the forwarding request to bypass the output queue structure if the number of forwarding requests pending at the output queue structure is below a second threshold.

13. The logic of claim 12, wherein the second threshold is one.

14. The logic of claim 9, wherein a determination is made to cause the forwarding request not to bypass the output queue structure, the logic further operable when executed to:
send the forwarding request to the output queue structure;
process the forwarding request in the output queue structure; and
select the forwarding request at the output queue structure.

15. The logic of claim 9, further operable when executed to:
before retrieving from the memory the packet associated with the forwarding request, place the forwarding request in a request buffer in a memory access unit associated with the particular output port, the request buffer comprising a plurality of forwarding requests;
order the plurality of forwarding requests at the request buffer; and
select the forwarding request at the request buffer.

16. The logic of claim 9, further operable when executed to:
before retrieving from the memory the packet associated with the forwarding request, place the forwarding request in a request buffer in a memory access unit associated with the particular output port, the request buffer comprising a plurality of forwarding requests;
process the plurality of forwarding requests in a first in first out manner at the request buffer; and
select the forwarding request at the request buffer.

17. A system for bypassing an output queue structure of a switch, comprising:
an input port of a switch configured to receive a packet;
a memory of the switch configured to store the received packet;
a routing module comprising a forwarding request database, the routing module configured to:
generate a forwarding request associated with the stored packet and with a particular output port of the switch, the forwarding request identifying the location in the memory of the stored packet; and
send the forwarding request to a memory access unit; and
a memory access unit associated with the particular output port and configured to:
receive the forwarding request from the routing module;
determine whether to cause the forwarding request to bypass an output queue structure associated with the particular output port;
using the forwarding request, retrieve from the memory the packet associated with the forwarding request; and
send the received packet from the particular output port.

18. The system of claim 17, wherein:
the memory access unit comprises a request buffer;
determining whether to cause the forwarding request to bypass the output queue structure comprises determining the number of forwarding requests pending in the request buffer; and
the memory access unit is further configured to cause the forwarding request to bypass the output queue structure if the number of forwarding requests pending in the request buffer is below a first threshold.

19. The system of claim 18, wherein the first threshold is less than or equal to the maximum number of forwarding requests storable in the request buffer.

20. The system of claim 18, wherein:
determining whether to cause the forwarding request to bypass the output queue structure further comprises determining the number of forwarding requests pending at the output queue structure; and
the memory access unit is further configured to cause the forwarding request to bypass the output queue structure if the number of forwarding requests pending at the output queue structure is below a second threshold.

21. The system of claim 20, wherein the second threshold is one.

22. The system of claim 17, wherein:
a determination is made to cause the forwarding request not to bypass the output queue structure;
the memory access unit is further configured to send the forwarding request to the output queue structure; and
the system further comprising an output queue structure associated with the particular output port and configured to:
process the forwarding request; and
select the forwarding request.

23. The system of claim 17, wherein the memory access unit comprises a request buffer, the memory access unit further configured to:
before retrieving from the memory the packet associated with the forwarding request, place the forwarding request in the request buffer, the request buffer comprising a plurality of forwarding requests;
order the plurality of forwarding requests; and
select the forwarding request.

24. The system of claim 17, wherein the memory access unit comprises a request buffer, the memory access unit further configured to:
before retrieving from the memory the packet associated with the forwarding request, place the forwarding request in the request buffer, the request buffer comprising a plurality of forwarding requests;
process the plurality of forwarding requests in a first in first out manner; and
select the forwarding request.

25. A system for bypassing an output queue structure of a switch, comprising:
an input port of a switch configured to receive a packet;
a memory of the switch configured to store the received packet;
a routing module comprising a forwarding request database, the routing module configured to:
generate a forwarding request associated with the stored packet and with a particular output port of the switch, the forwarding request identifying the location in the memory of the stored packet; and
determine whether to cause the forwarding request to bypass an output queue structure associated with the particular output port; and
a memory access unit associated with the particular output port and configured to:
receive the forwarding request;
using the forwarding request, retrieve from the memory the packet associated with the forwarding request; and
send the received packet from the particular output port.

26. The system of claim 25, wherein:
the memory access unit comprises a request buffer;
determining whether to cause the forwarding request to bypass the output queue structure comprises determining the number of forwarding requests pending in the request queue;
the routing module is further configured to cause the forwarding request to bypass the output queue structure if the number of forwarding requests pending in the request buffer is below a first threshold.

27. The system of claim 26, wherein the first threshold is less than or equal to the maximum number of forwarding requests storable in the request buffer.

28. The system of claim 26, wherein:
determining whether to cause the forwarding request to bypass the output queue structure further comprises determining the number of forwarding requests pending at the output queue structure; and
the routing module is further configured to cause the forwarding request to bypass the output queue structure if the number of forwarding requests pending at the output queue structure is below a second threshold.

29. The system of claim 28, wherein the second threshold is one.

30. The system of claim 25, wherein:
a determination is made to cause the forwarding request not to bypass the output queue structure; and
the routing module is further configured to send the forwarding request to the output queue structure; and
the system further comprising an output queue structure associated with the particular output port and configured to:
process the forwarding request; and
select the forwarding request.

31. The system of claim 25, wherein the memory access unit comprises a request buffer, the memory access unit further configured to:
before retrieving from the memory the packet associated with the forwarding request, place the forwarding request in the request buffer, the request buffer comprising a plurality of forwarding requests;
order the plurality of forwarding requests; and
select the forwarding request.

32. The system of claim 25, wherein the memory access unit comprises a request buffer, the memory access unit further configured to:
before retrieving from the memory the packet associated with the forwarding request, place the forwarding request in the request buffer, the request buffer comprising a plurality of forwarding requests;
process the plurality of forwarding requests in a first in first out manner; and
select the forwarding request.

* * * * *